United States Patent
Kulaga et al.

(10) Patent No.: US 12,153,671 B2
(45) Date of Patent: Nov. 26, 2024

(54) ANTIMALWARE SCAN WITH DECOMPILATION

(71) Applicant: Acronis International GmbH, Schaffhausen (CH)

(72) Inventors: Andrey Kulaga, Moscow (RU); Serg Bell, Singapore (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 238 days.

(21) Appl. No.: 17/804,838

(22) Filed: May 31, 2022

(65) Prior Publication Data

US 2023/0385408 A1 Nov. 30, 2023

(51) Int. Cl.
*G06F 21/55* (2013.01)
(52) U.S. Cl.
CPC .................................. *G06F 21/554* (2013.01)
(58) Field of Classification Search
CPC ..... G06F 21/554; G06F 21/562; G06F 21/563
USPC .......................................................... 726/23
See application file for complete search history.

(56) References Cited

U.S. PATENT DOCUMENTS

| | | | |
|---|---|---|---|
| 5,860,008 A | 1/1999 | Bradley | |
| 7,237,226 B2 | 6/2007 | Simonyi | |
| 8,561,194 B2 | 10/2013 | Lee | |
| 9,165,142 B1 | 10/2015 | Sanders et al. | |
| 11,347,850 B2 | 5/2022 | Boulton et al. | |
| 11,477,232 B2 | 10/2022 | Kulaga et al. | |
| 2011/0010697 A1* | 1/2011 | Golovkin | G06F 21/563 726/23 |
| 2018/0144133 A1* | 5/2018 | Hoover | G06F 21/566 |
| 2022/0050899 A1 | 2/2022 | Tormasov et al. | |
| 2022/0237300 A1* | 7/2022 | Regev | G06F 16/245 |
| 2023/0252152 A1* | 8/2023 | Yerra | G06F 8/53 726/26 |

FOREIGN PATENT DOCUMENTS

| | | | |
|---|---|---|---|
| CN | 103761481 A | | 4/2014 |
| CN | 109670311 A | * | 4/2019 |
| JP | 6568564 B2 | | 8/2019 |

OTHER PUBLICATIONS

Acronis Cyber Protect Documentation, Configuring your antivirus and antimalware protection > Antimalware scan of backups, https://tinyurl.com/2p8t93cd, May 31, 2023.
Antimalware Scans of Backups: Creating More Security Without Harming Performance or Usability, https://www.acronis.com/en-sg/blog/posts/antimalware-backup-archive-scanning/, Sep. 28, 2020.

* cited by examiner

*Primary Examiner* — Taghi T Arani
*Assistant Examiner* — Pegah Barzegar
(74) *Attorney, Agent, or Firm* — ESPE Legal Consultancy FZ-LLC

(57) ABSTRACT

A system for detection of binary files containing a known malware code fragment includes a processor coupled to a memory storing instructions, the processor being configured to implement the instructions to process an unknown binary file (UBF) and a known malicious source code file (KMSCF) to decompile the UBF into a text-based unknown source code (USC) and identify whether the KMSCF is contained within the USC.

20 Claims, 2 Drawing Sheets

ANTIMALWARE SCAN WITH DECOMPILATION

TECHNICAL FIELD

The invention pertains to computer systems and detection of a known malware within the computer systems based on security analysis of previously compiled files.

BACKGROUND

Malicious software penetrates and harms computer systems without the knowledge or consent of the owners. Malware is an ongoing problem in computer security. One of the ways to identify malware is to match a given file to a list of known malware files.

One of the traditional approaches to detect malicious programs is to compare the "signatures" of the files under investigation. When antivirus companies detect a new sample, they analyze it and create a "signature" that is released as an update to clients.

These "signatures" are normally calculated using the contents of the entire file, and hence the entire file has to be read in order for the "signature" to be calculated.

Currently, the process of answering the question of whether a given file is found in a malware list includes calculating a "signature" of that file and further comparing that "signature" to "signatures" of each of the files in the list of known malware files.

The existing approach does not allow to detect binary files that have not previously been identified as malicious but contain known malicious code by simply analyzing their contents (e.g., without execution in a "sandbox").

Developers of malicious code also use different obfuscation techniques including morphing that produce binary files having similar or identical functionality but physically different from each other. It is impossible to identify such morphed files by using a database of known malicious files. Therefore, a different approach is needed.

SUMMARY

The present invention includes decompilation of an unknown file followed by textual comparison of its contents to known malicious code fragments. In other words, the present invention uses the operation of decompilation—a type of reverse-engineering that performs the opposite operations of a compiler.

Normally, a software developer writes programming code in a human-readable language.

Some software languages, the so-called "scripting languages," and related environments do not require additional processing, and can be executed by a computer.

Other software languages, the so called "compiled languages," and related environments require an additional step of compilation to convert the human-readable source code into a binary code—a set of commands that are understood by a computer system.

The present invention is related to security analysis of previously compiled files.

Decompilation is a reverse process to compilation (i.e., it is the process of converting a binary file into human-readable instructions).

In general, the disassembly process may yield multiple results. Certain other "fast decompilation" approaches may be used that reconstruct software language constructs with high probability from chains of assembly instructions using heuristics generated by a probabilistic approach, neural networks, linear classifiers, support vector system, or other approaches.

Once the file is decompiled, a text file can be searched for occurrences of known blocks of malicious code.

In addition to that, certain code transformation steps may be taken to account for potential obfuscating steps, such as renaming of variables, insertion of "garbage" code, etc.

Software development languages contain control structures—building blocks of computer programs. They are commands that allow a program to make decisions and to take steps following the directions of a developer.

Additional pre-compilation or compilation steps and automatic debugging may be used to discover logical groups of control structures (LGCS) within the decompiled files that match the control structures within the known malicious code fragments.

BRIEF DESCRIPTION OF DRAWINGS

The exemplary aspects of the invention will be better understood from the following detailed description of the exemplary embodiments of the invention with reference to the drawings.

DETAILED DESCRIPTION

In an exemplary aspect of the present invention, a system for implementing an antimalware scan with decompilation is applied to unknown binary files (UBF) for a purpose of identification of files that contain known malicious code by matching their decompiled contents against the list of known malicious source code fragments (KMSCF).

A decompilation and source code analysis module (DSCAM) receives the UBF and KMSCF, decompiles the UBF, and applies certain analysis to identify if the contents of the KMSCF are a part of the decompiled UBF.

The analysis that the DSCAM applies to identify if the contents of the KMSCF are a part of decompiled UBF can be as simple as a textual match or may include additional steps (e.g., removal of comments, formatting, identification of "garbage" code, and other obfuscation steps), normalization of variable names, as well as advanced actions (e.g., pre-compilation, compilation, or dynamic execution or debugging steps to identify the presence of control structures from KMSCF in the decompiled UBF).

Figure 1:
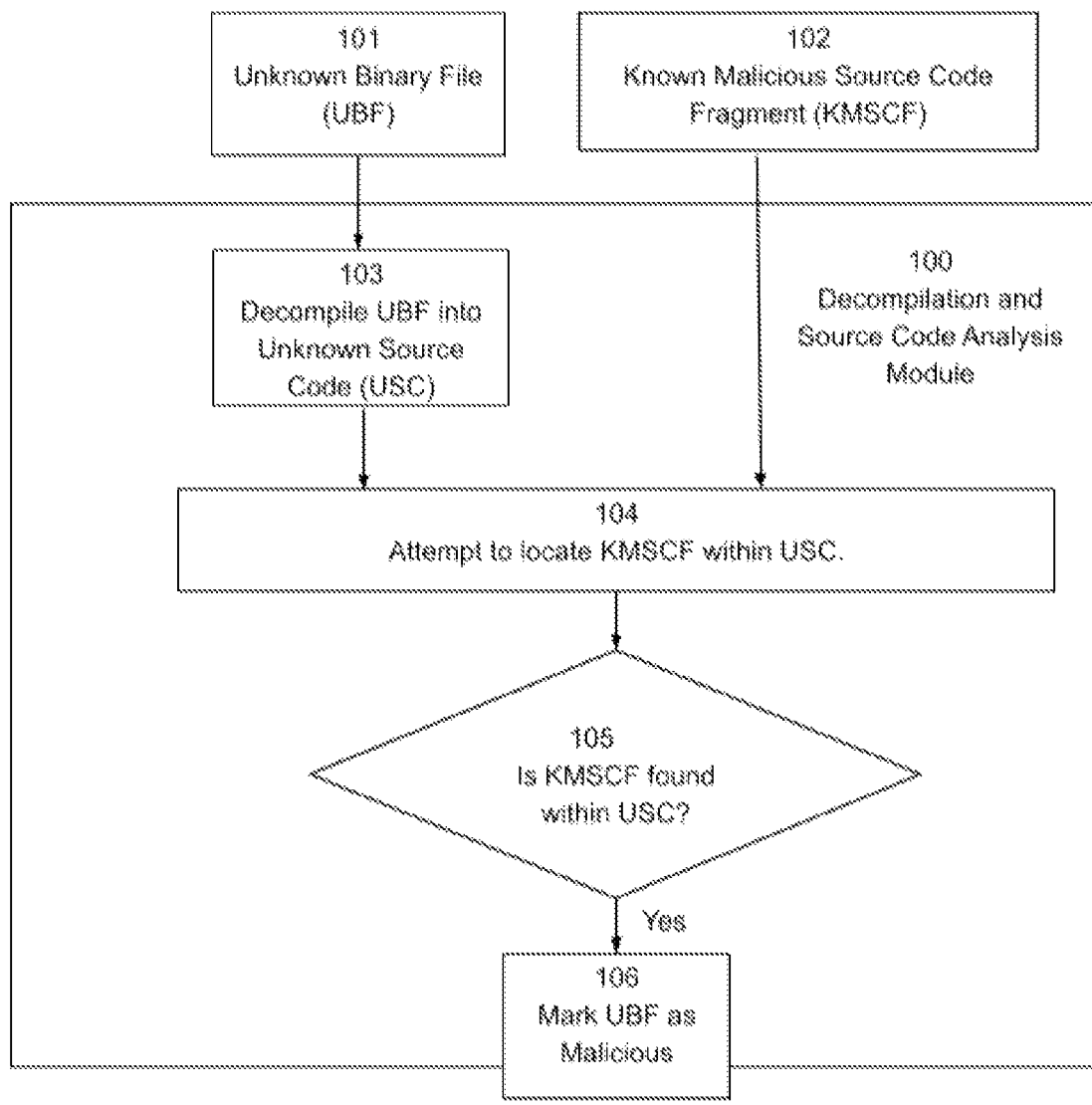
FIG. 1 shows an exemplary procedure for an operation of decompilation and source code analysis according to an exemplary embodiment.

FIG. 1 shows the components and interactions of an exemplary procedure of Decompilation and Source Code Analysis Module (DSCAM) (100) embodying the invention.

The DSCAM (100) receives an unknown binary file UBF (101) and a known malicious source code fragment KMSCF (102).

The DSCAM (100) decompiles the UBF (101) into an unknown source code USC (103).

Then, the DSCAM (100) performs analysis to identify if the KMSCF (102) is present within USC (103).

That analysis may be (1) a simple text comparison, (2) additional steps to account for different formatting or obfuscation steps, and (3) additional steps analyzing the control structures within both the USC (103) and KMSCF (102), or other methods that may detect the presence of a source code fragment similar in its functionality to the KMSCF (102) within USC (103).

The DSCAM (100) may also be used to compare UBF (101) to a collection of KMSCFs (102). After the DSCAM (100) detects the presence of at least one of the KMSCFs (102) within the decompiled version of UBF (101), it marks the UBF (101) as malicious.

If the DSCAM (100) does not detect any of the known KMSCFs (102) within the decompiled version of UBF (101), then it does not mark the UBF (101) as malicious. Depending on the design of the scanning process, a flag may be passed to the downstream process to perform additional analysis of UBF (101), or the UBF (101) may be marked as safe.

Figure 2:
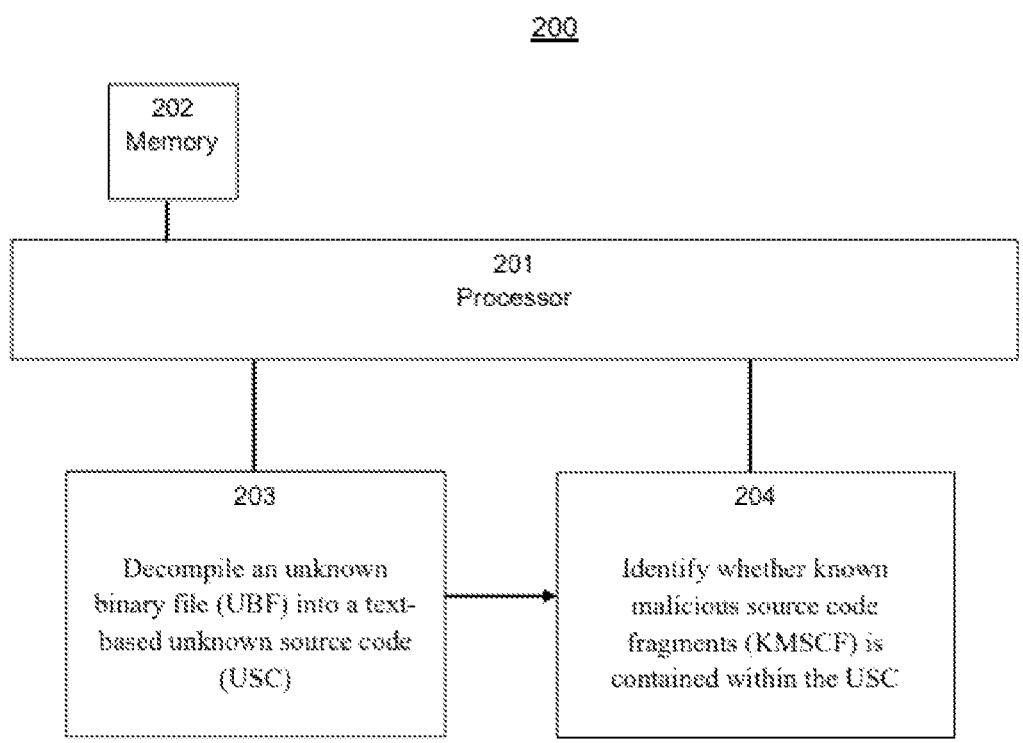
FIG. 2 shows the components and interactions of an exemplary system for decompilation and source code analysis embodying the invention.

FIG. 2 shows the components and interactions of an exemplary system (200) for decompilation and source code analysis embodying the invention.

System (200) is implemented for detection of binary files containing a known malware code fragment.

System (200) includes a processor (201) (e.g., Central Processing Unit (CPU)) of a computer coupled to a memory (202) that stores instructions that are implemented by the processor (201).

The processor (201) is configured to implement the instructions for system (200) to process an unknown binary file (UBF) and a known malicious source code file (KMSCF), to decompile (203) the UBF into a text-based unknown source code (USC) file and identify (204) whether the KMSCF is contained within the USC.

In an exemplary embodiment, in system (200), the processor (201) applies a textual search to identify the KMSCF within the USC.

In an exemplary embodiment, in system (200), the processor (201) removes comments and formatting from the KMSCF or the USC.

In an exemplary embodiment, in system (200), the processor (201) performs steps to address obfuscation methods used within the USC.

In an exemplary embodiment, in system (200), the processor (201) applies dynamic steps to identify if control structures of the KMSCF are present in the USC.

The dynamic steps may include pre-compilation, compilation, dynamic execution, or debugging.

In an exemplary embodiment, the system (200) is applied to multiple KMSCFs, each including the KMSCF, for a single one of the UBF.

If at least one of the KMSCFs is found to be present within the USC, then a corresponding one of the UBF is considered malicious.

If no one of the KMSCFs is found within the USC, then the corresponding one of the UBF is configured to be declared not malicious, or a flag is configured to be generated for further analysis or processing.

In an exemplary embodiment, the system (200) is applied to multiple KMSCFs, each including the KMSCF, for multiple UBFs, each including the UBF.

If at least one of the KMSCFs is found to be present within the USC, then a corresponding UBF is considered malicious.

If no KMSCFs is found within the USC, then the corresponding UBF is configured to be declared not malicious, or a flag is configured to be generated for further analysis or processing.

It is noted that some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "decompiling," "identifying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit or can be spread across a number of components in any number of ways. When performed by software, the methods may be executed by a processor, such as a general-purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects or components of the described example implementations may be used singly or in any combination.

The invention claimed is:

1. A method for detection of binary files containing a known malware code fragment in a computing environment with at least one processor, an unknown binary file (UBF), and a known malicious source code fragment (KMSCF), the method comprising:
   decompiling the UBF into a text-based unknown source code (USC) by reconstructing software language constructs from a chain of assembly instructions using heuristics; and
   identifying whether the KMSCF is contained within the USC including:
      removing at least one comment from the USC and removing at least one format from the USC to create a standardized USC,
      comparing the standardized USC against a list of known malicious source code fragments, and
      determining at least one logical group of control structures within the USC that match at least one control structure within the known malicious code fragment by applying at least one of pre-compilation, compilation, dynamic execution, or debugging to the USC, wherein when the matching indicates that the KMSCF is found to be present within the USC, a corresponding UBF is considered malicious, and when the KMSCF is not found within the USC, then the corresponding UBF is considered not malicious, or a flag is generated for further analysis or processing.

2. The method of claim 1, wherein the identifying whether the KMSCF is contained within the USC includes applying a textual search of the list of known malicious source code fragments based on the standardized USC.

3. The method of claim 1, wherein the identifying whether the KMSCF is contained within the USC includes addressing obfuscation methods used within the USC.

4. The method of claim 1, wherein the identifying whether the KMSCF is contained within the USC includes applying dynamic operations.

5. The method of claim 1, wherein the decompiling and identifying are applied to multiple KMSCFs, each including the KMSCF, for a single one of the UBF.

6. The method of claim 5, wherein, if at least one of the KMSCFs is found to be present within the USC, then a corresponding UBF is considered malicious, and
   wherein, if no one of the KMSCFs is found within the USC, then the corresponding UBF is considered not malicious, or a flag is generated for further analysis or processing.

7. The method of claim 1, wherein decompiling and identifying are applied to multiple KMSCFs, each including the KMSCF, for multiple UBFs, each including the UBF.

8. The method of claim 7, wherein, if at least one of the KMSCFs is found to be present within the USC, then a corresponding UBF is considered malicious, and
   wherein, if no one of the KMSCFs is found within the USC, then the corresponding UBF is considered not malicious, or a flag is generated for further analysis or processing.

9. A system for detection of binary files containing a known malware code fragment, the system comprising:
   a processor coupled to a memory storing instructions, the processor being configured to implement the instructions to process an unknown binary file (UBF) and a known malicious source code fragment (KMSCF), to:
      decompile the UBF into a text-based unknown source code (USC) by reconstructing software language constructs from a chain of assembly instructions using heuristics; and
   identify whether the KMSCF is contained within the USC including:
      removing at least one comment from the USC and removing at least one format from the USC to create a standardized USC,
      comparing the standardized USC against a list of known malicious source code fragments, and
      determining at least one logical group of control structures within the USC that match at least one control structure within the known malicious code fragment by applying at least one of pre-compilation, compilation, dynamic execution, or debugging to the USC, wherein when the matching indicates that the KMSCF is found to be present within the USC, a corresponding UBF is considered malicious, and when the KMSCF is not found within the USC, then the corresponding UBF is considered not malicious, or a flag is generated for further analysis or processing.

10. The system of claim 9, wherein the processor applies a textual search of the list of known malicious source code fragments based on the standardized USC.

11. The system of claim 9, wherein the processor addresses obfuscation methods used within the USC.

12. The system of claim 9, wherein the processor applies dynamic operations to identify if control structures of the KMSCF are present in the USC.

13. The system of claim 9, wherein the system is applied to multiple KMSCEs, each including the KMSCF, for a single one of the UBF.

14. The system of claim 13, wherein, if at least one of the KMSCFs is found to be present within the USC, then a corresponding one of the UBF is considered malicious, and
   wherein, if no one of the KMSCFs is found within the USC, then the corresponding one of the UBF is considered not malicious, or a flag is generated for further analysis or processing.

15. The system of claim 9, wherein the system is applied to multiple KMSCEs, each including the KMSCF, for multiple UBFs, each including the UBF.

16. The system of claim 15, wherein, if at least one of the KMSCFs is found to be present within the USC, a corresponding UBF is considered malicious, and
   wherein, if no one of the KMSCFs is found within the USC, the corresponding UBF is considered not malicious, or a flag is generated for further analysis or processing.

17. The method of claim 1, wherein identifying whether the KMSCF is contained within the USC further comprises identifying at least one section of obfuscated garbage code within the USC.

18. The method of claim 1, wherein identifying whether the KMSCF is contained within the USC further comprises normalizing at least one variable name within the USC.

19. The system of claim 9, wherein the processor is further configured to identify whether the KMSCF is contained within the USC further by identifying at least one section of obfuscated garbage code within the USC.

20. The system of claim 9, wherein the processor is further configured to identify whether the KMSCF is contained within the USC further by normalizing at least one variable name within the USC.

* * * * *